Oct. 18, 1966 T. J. KOWALIK ET AL 3,279,313
PROJECTOR SCREENS AND METHOD AND APPARATUS FOR USING SAME
Filed May 18, 1964 2 Sheets-Sheet 1
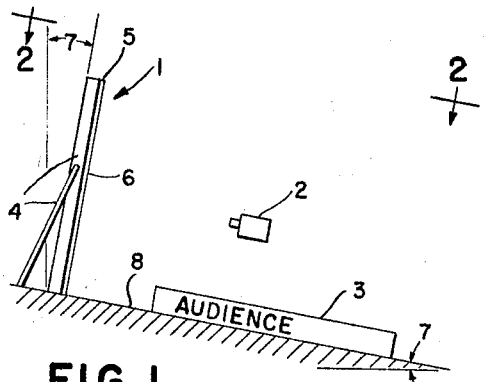
FIG.1.
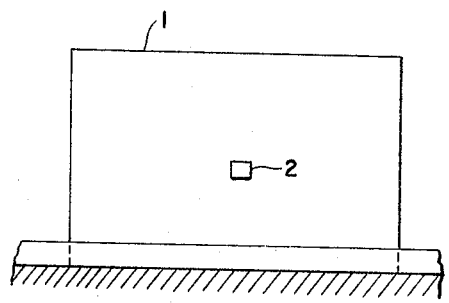
FIG.3.
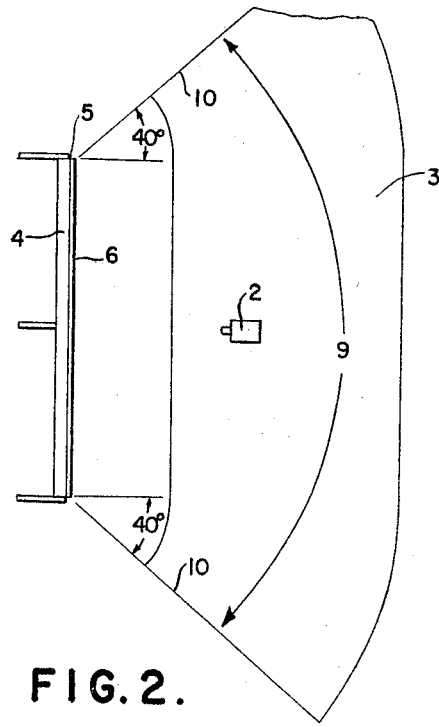
FIG.2.
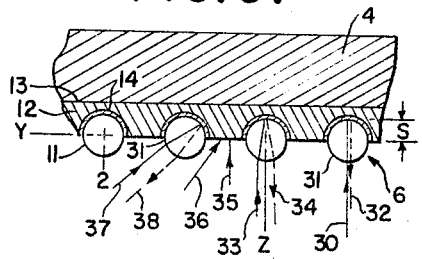
FIG.4.
FIG.5.
FIG.6.
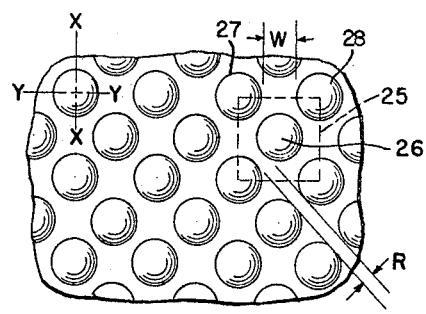
FIG.7.
INVENTORS
Thomas J. Kowalik
Anthony J. Vallelunga &
Albert J. Perron
BY Arnold and Roylance
ATTORNEYS

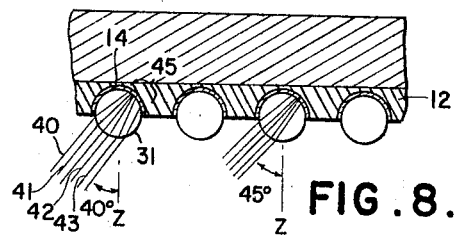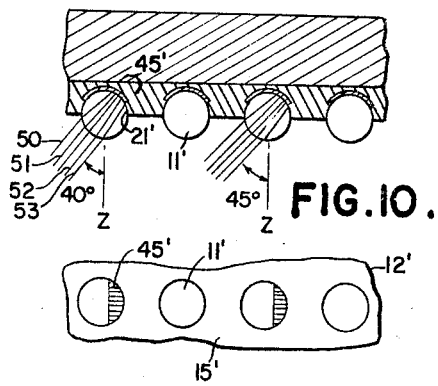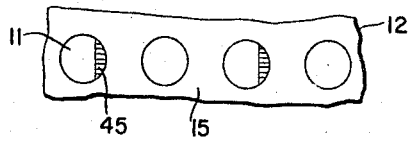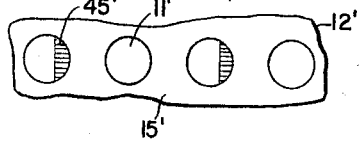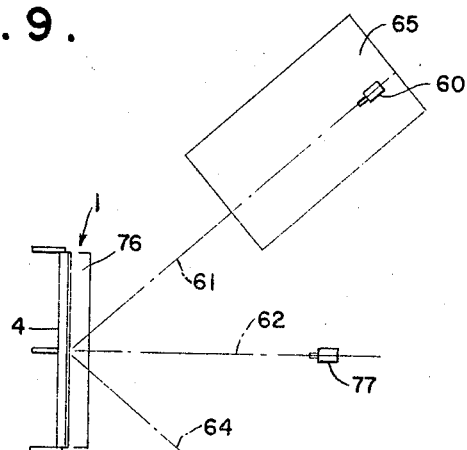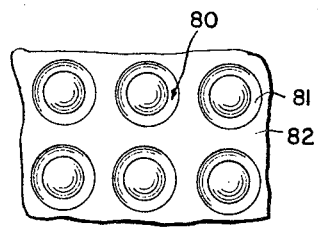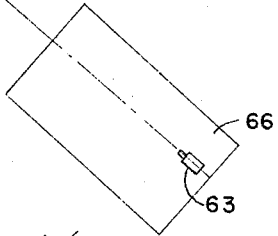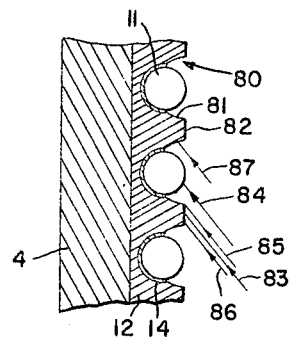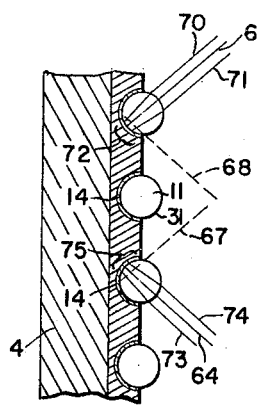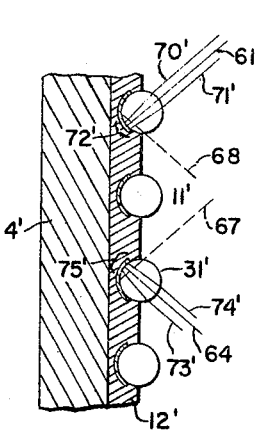

United States Patent Office 3,279,313
Patented Oct. 18, 1966

3,279,313
PROJECTOR SCREENS AND METHOD AND APPARATUS FOR USING SAME
Thomas J. Kowalik, Amsterdam, Anthony J. Vallelunga, Albany, and Albert J. Perron, Amsterdam, N.Y., assignors to International Product Design and Research Corporation, Amsterdam, N.Y., a corporation of New York
Filed May 18, 1964, Ser. No. 368,283
10 Claims. (Cl. 88—28.9)

This invention relates generally to a highly reflective screen for displaying an image projected thereon and more particularly to such a screen with sufficient reflective brilliance to permit displaying an image for viewing during daylight conditions, or other conditions of high levels of directed or random light.

The projection screen of this invention combines the advantages of a plurality of reflex-reflecting complexes supported in a regular array in spaced relation one to the other with the spaces between each of adjacent ones of the complexes presenting a surface that is as close to being a perfect optically black material as is practically possible, from the standpoint of commercial manufacture.

Applicants have discovered that by combining the reflective properties of reflex-reflecting complexes with the absorptive properties of a matte black material a screen is provided which has brilliant reflecting characteristics for an image projected thereon from a certain predetermined sector relative to the plane of the complexes. The image thus projected can be viewed from another sector related to the first. However, undesired directed beams of light which impinge on the complexes from a point outside the predetermined sector are almost completely reflected back to their source and those beams which impinge on the absorptive surfaces are sufficiently absorbed by the optically black material that the presence of the extraneous light is not noticed by a viewer.

In the past there have been numerous attempts to devise a still and moving picture display screen which exhibits images projected thereon at high degree of brilliancy during daylight conditions. Such screens normally include a highly reflective surface or a plurality of randomly disposed reflecting complexes secured to a reflective surface of the screen. In some instances the complexes are originally transparent objects, imbedded in a reflective paint or coating having adhesive properties to which the complexes adhere, the coating providing a reflective surface for the transparent objects as well as reflective surface on the screen material adjacent each complex, e.g., the spaces between the objects also have reflective properties. In some other known structures reflective elements having all their surfaces coated with reflective material are merely distributed on to an adhesively coated surface in random fashion to provide a reflecting screen. However, all the known prior art structures can successfully display images only at conditions of subdued daylight which are essentially the same as conditions prevailing at twilight.

The screen of this invention, on the other hand, permits the display of images under all but intense daylight conditions, and where the rays of the sun impinge on the screen at an angle of 30° or less relative to a perpendicular to the surface of the screen. This feature makes the screen of this invention particularly well adapted for use in outdoor movie theaters, since the screen can be so oriented when installed that the rays of the sun strike the screen at an angle greater than 30° relative to a perpendicular to the screen. Hence, the show can begin before dusk thereby permitting several shows during the summer months when daylight conditions prevail until about 8:30 in the evening. Thus, it is possible to start the show, for example at 7:30 so long as the screen is oriented so the setting sun is outside an angle of 30° relative to the surface of the screen.

In view of the foregoing it is an object of this invention to provide a unique projector screen particularly adapted for outdoor use under relatively high extraneous light conditions.

Another object is to provide a cinema screen which displays brilliant images at high indoor light levels.

Another object of this invention is to provide a projecting screen which combines the advantages of the reflecting properties of a plurality of spaced apart reflex-reflecting complexes with the absorptive characteristics of an optically black material visible between the complexes.

Another object is to provide a screen on which the complexes are minute glass spheres disposed on a matte black surface in suitable spaced relation to obtain a desired contrast ratio which provides for brillant reflection of desired light and almost complete elimination of undesired light projected thereon;

A further object is to provide a screen having a matte black surface exposed between each of a plurality of reflex-reflecting complexes disposed in regular array on the black surface;

A further object is to provide a screen in which certain areas of each of a plurality of objects which form a portion of the surface of the screen are reflective and certain other areas are absorptive to light impinging thereon;

A further object is to provide a single screen on which two or more different images can be displayed simultaneously, only one of said images being viewable by each of two or more audiences;

A still further object is a method for displaying at least two different images on the same screen simultaneously, only one of the images being viewable by each of at least two audiences;

Another and further object is to provide such a screen which is durable, resistant to weathering and inexpensive to construct.

The following specification, of which the accompanying drawings form a part, explains the manner in which the foregoing objects are attained in accordance with this invention. In the drawings:

FIG. 1 is a view in side elevation showing the screen of this invention in use with a single audience;

FIG. 2 is a top view of FIG. 1 looking along lines 2—2;

FIG. 3 is a front elevational view of the screen and apparatus of FIG. 2;

FIG. 4 is an enlarged partial view in section of a portion of the screen looking along lines 4—4 of FIG. 3, and showing a first preferred embodiment of the screen;

FIG. 5 is an enlarged partial view in front elevation of the screen showing one arrangement for beads on the face of the screen;

FIG. 6 is a view similar to FIG. 4 showing a second embodiment of the screen;

FIG. 7 is a view similar to FIG. 5 showing a second arrangement for beads on the face of the screen;

FIG. 8 is a view similar to FIG. 4 illustrating the effect of extraneous light;

FIG. 9 is a front view of FIG. 8;

FIG. 10 is a view similar to FIG. 6 illustrating the effect of extraneous light;

FIG. 11 is a front view of FIG. 10;

FIG. 12 is a plan view of an apparatus for simultaneously displaying two images on the same screen, each for view independently of the other;

FIG. 13 is an enlarged partial view in section of one embodiment of the screen of FIG. 12;

FIG. 14 is an enlarged partial view in section of another embodiment of the screen of FIG. 12;

FIG. 15 is a view similar to FIG. 5 shown a third embodiment of the screen; and

FIG. 16 is a plan view in section of FIG. 15.

Turning now to the drawings in detail and particularly to FIGS. 1 and 2 there is shown a flat screen 1, a projector 2 for projecting an image onto screen 1, and an audience 3 situated to view the image displayed on screen 1. Although the screen is shown in FIG. 1 to be in the environment of an outdoor movie theater, it is to be understood that the screen of this invention is not limited to such an application but has many other uses, particular where high levels of illumination are encountered, and it is desired to clearly display images on the screen.

As shown in FIGS. 1 through 3 the screen is substantially flat, has a rectangular outlying configuration, and includes a supporting structure 4 to which a composite member 5 is secured, composite member 5 having a generally flat face 6 on which an image is to be projected.

FIGS. 1–3 show the screen in use in the environment of an outdoor theater. As shown in FIG. 1 the screen is tilted toward the audience at an angle 7 of 5° to 10° from the vertical. The terrain 8 in front of face 6 of the screen is also graded at a like angle 7, such grading having been found to be more comfortable for the audience and permitting the audience to view the screen at a slight upward angle as is usually the case in a normal indoor theater. The audience is situated in front of screen 1 within an area 9 bounded by horizontal lines 10, lines 10 being at an angle of approximately 30° to 40° to a perpendicular to face 6 and extending from adjacent the sides of the screen. For reasons that will subquently be described in detail, viewers outside area 9 can view the picure projected on the screen but with a much lesser brilliance and resolution than viewers within area 9. Projector 2 is preferably located along a line perpendicular to the center of face 6 of the screen so that the image is uniformly displayed on the face.

For purposes of explanation it is desirable to consider each of the beads of the embodiments of FIGS. 4 and 6 as having an X axis which is substantially vertical and parallel with face 6 of the screen, when the screen is disposed as shown in FIGS. 1 through 3, a Y axis perpendicular to and intersecting the X axis at the center of the bead, the Y axis also being parallel to face 6 of the screen, and a Z axis perpendicular to the plane defined by the X and Y axes and intersecting same at the center of the bead.

FIG. 4 shows one preferred embodiment of the structure of screen 1. In this embodiment composite member 5 is comprised of a plurality of reflex-reflecting complexes in the form of transparent generally spherical objects which are preferably glass beads 11 secured to a support in the form of a backing member 12 by embedding portions of the beads in the material of the backing member. Backing member 12 is secured to supporting structure 4 in any well known manner for example, by means of adhesive 13 between backing member 12 and supporting structure 4. Each bead 11 has a reflective surface provided by a coating 14 of reflective material on a portion of the surface of the bead. As shown in FIG. 4 the entire surface of the embedded portion of each bead 11 is provided with reflective coating 14.

FIG. 5 shows one preferred arrangement for beads 11 on backing member 12. As shown, the beads are spaced apart to provide an exposed surface 15 of backing member 12 between each of the beads. The beads are arranged in an array of regular rectangular coordinates with equal spacing between each bead in a horizontal row and each bead in a vertical row. Each bead has a diameter $d$. The distance between the sides of adjacent beads is designated $t$. It has been found that a value of $t$ in the range of from $\frac{1}{4}d$ to $d$ provides excellent results with the screen of the FIG. 4 embodiment. Although FIG. 4 shows the beads to be spaced apart a distance approximately equal to their diameter it is to be understood that a spacing of as little as $\frac{1}{4}d$ is within the scope of this invention.

Referring again to FIG. 4 it is seen that each bead 11 is partially embedded in backing member 12. As shown in FIG. 4 each bead is embedded in the backing member a distance S as measured along the Z axis of the bead the Z axis being perpendicular to the plane of the backing member. As illustrated in FIG. 4 the distance S equals one-half the diameter of the bead, and correspondingly, 50% of the surface of the bead is disposed within backing member 12. Since, in the FIG. 4 embodiment the entire embedded surface of each bead is provided with reflective coating 14, it is evident that 50% of the surface of each bead has a reflective surface. It has been found that equally good results are obtained with the FIG. 4 embodiment with values of S appropriately selected so that the percentage of the surface of each bead provided with coating 14 is in the range of 25% to 60% of the entire surface of each bead.

Neither the composition of backing member 12 nor the composition of reflective coating 14 is critical. However, the material or backing member 12 must have properties so that the exposed surface 15 between beads is as theoretically optically black as is commercially possible, and still permits manufacture at relatively low cost. Hence, the material of backing member 12 is preferably a well known matte black material. For ease of embedding the beads in backing member 12, the backing member may be made of any well known moldable binder material which can be thermoplastic or thermosetting, if plastic is desired, or could be asphaltic or ceramic, preferably in a moldable form.

Although the exact composition of reflective coating 14 is also not critical, coating 14 must be of a truly reflective material having a photometric brightness greater than 1.8.

Due to the reflex-reflecting action which takes place when light impinges on beads 11, it has been found that beads of a refractive index in the range of 1.5 to 1.9 work very well. However, optimum values of brightness and resolution are obtained where the index of refraction of the beads is between 1.6 and 1.8, a bead with an index of refraction of 1.68 providing excellent results.

Now consider the embodiment of the screen structure shown in FIG. 6. In this embodiment a backing member 12' is secured to supporting structure 4' with adhesive 13' in a manner similar to that described for the embodiment of FIG. 4. Beads 11' are partially embedded in backing 12'. A coating 14' of reflective material like reflective coating 14 covers only a part of the embedded portion of each bead 11'.

Referring again to the FIG. 6 embodiment it is seen that coating 14' covers only a part of the embedded portion of each bead, the coated portion of the bead being at a zone thereof defined by a plane perpendicular to the Z axis of the bead and intersecting same at a location offset to one side of the center of the bead, as shown. The zone thus defined is designated 20 in FIG. 6. Adjacent zone 20 is another zone 21, the surface of bead 11' in zone 21 being covered by the material of backing member 12. The remaining uncoated portion of the bead defines a zone designated 22 which projects beyond backing member 12 to provide a transparent exposed surface. In view of this arrangement it is apparent that each bead has a reflective surface at a first zone 20, an exposed transparent surface at a second zone 22, and a matte black surface at a third zone 21, the three zones defining the entire spherical surface of each bead 11'. Beads 11' may be embedded in backing member 12' to a depth U so that the embedded surface of bead 11' is in a range of approximately 30% to 60%. It has been found that a coating 14' which covers less than 80% of the embedded portion of the bead 11' provides superior results. Hence, when 30% of the surface of a bead 11' is embedded in backing member 12' coating 14' covers 80% of the embedded portion of the bead or only 24% of the entire surface of the bead. Correspondingly, when 60% of the bead is embedded coating 14' will cover 80% of the embedded surface or approximately 48% of the entire surface of each bead 11'.

Turning now to FIG. 7 there is shown another preferred arrangement of the beads for both the embodiments of FIG. 4 and FIG. 6. As shown in FIG. 7, the beads in each horizontal row are aligned with each other, and the beads in each vertical row are also aligned with each other. However, beads in every second row are disposed with their centers offset half the distance between beads of immediately adjacent rows. Due to this arrangement the lines joining the centers of adjacent beads in every second row form a square 25 as shown in broken lines in FIG. 7. The intersection 26 of the diagonals of square 25 defines the location of the center of a bead in an intermediate row. By disposing beads with their centers at points 26 as well as at the apices of each square 25 this arrangement being the same over the entire surface of the screen a substantially larger area of face 6 is covered with beads than in the arrangement shown in FIG. 5. It is to be noted that the distance R between beads 27 and 28 lying on a diagonal of square 25 is substantially less than the distance W between beads 29 and 30 lying along a side of square 25. It has been found that values of R in a range of between ⅛d and ½d work particularly well for the bead arrangement of FIG. 7.

In both embodiments of FIGS. 4 and 6 the beads may range in diameter from between .01 inch to .1 inch depending on the use of the screen from which the beads are made. Where a screen is to be used for projecting home movies for example where the audience is only a few feet from the surface of the screen a bead diameter on the order of .01 inch, and perhaps even smaller is necessary to eliminate a granular effect on the image projected on the screen. On the other hand, in large outdoor movie theaters where the closest person in the audience is perhaps 100 feet from the screen a bead size of .1 inch and even larger can be used without a graining effect being apparent to the audience. Since extremely small beads are very difficult to handle, it is desirable, from a manufacturing standpoint, to use the largest possible bead which will not show a grain-like image to the nearest viewer.

It is believed that the superior reflective characteristics of the screen of the embodiments of FIGS. 4 and 6 result from the combined highly discriminating reflective characteristics of the partially coated beads and the absorptive effects of the matte black surface 15 exposed between the beads. Referring again to FIG. 4 there is shown a light ray 30 projected toward the screen along a line coincident with the Z axis of bead 11. Since any axis of a sphere is normal to the surface of the sphere, there will be no refraction of ray 30 as it passes through surface 31 of bead 11. Therefore, ray 30 will be reflected directly back toward its source by reflective coating 14. The reflected ray is shown in dotted line in FIG. 4 and is designated 32. Now consider a directed ray 33 that impinges on the bead on a point spaced from the Z axis of the bead but parallel to this axis. Ray 33 is refracted as it passes through surface 31, is reflected by coating 14, to produce return ray 34 which is again refracted as it passes back through surface 31 so that return ray 34 is parallel with directed ray 33. Various directed light rays for example rays 35 and 36 which impinge on exposed surface 15 of backing member 12 are merely absorbed by the black material of surface 15. It has been found that this combined absorptive effect of black surface 15 and refractive effect of the beads with reflective coating 14 displays an image with good resolution and high brilliance even under high outside conditions of illumination.

The brillance of the image projected onto the screen is also substantially unaffected by directed rays of light impinging on the screen at angles greater than approximately 30° to the Z axis of a bead, the exact angle beyond which there is little if any effect on the image depending upon the depth to which the bead is embedded in backing member 12. Such a directed extraneous ray 37, shown at an angle of 45° to the Z axis of a bead, is refracted as it passes through surface 31, is reflected by coating 14 and is again refracted at surface 31 to produce a return ray 38. Since directed ray 37 is returned as ray 38 at an angle outside the normal viewing angle for the screen a directed ray such as 37 has little if any effect on the brightness of the image projected on face 6 of the screen. Other directed rays impinging on face 6 at the same angle as ray 37 are similarly reflected back toward their source, assuming of course that the rays impinge upon a bead. Those rays parallel to ray 37 which impinge upon surface 15 are effectively absorbed by the surface and hence are not visible to the audience. It is to be noted with particularity that a plurality of light rays directed toward a bead 11 at an angle of the Z axis of for example 45° impinge on only a very small percentage of reflective coating 14. Hence, even though such rays may be bright enough to interfere with the image, only a very small portion of the image will show such interference. Such a phenomena is shown diagrammatically in FIGS. 8 and 9. As shown in FIG. 8, rays 40–43 impinge on bead 44 having a surface 45. Ray 40 is refracted as it passes through surface 31 and then impinges on reflective coating 14. Ray 41 is similarly refracted toward the center of the bead and also impinges on coating 14. Rays 42 and 43 which impinge on the bead at the other side of its center are refracted toward the center to also impinge on the reflective coating. It is to be noted that a small portion 45 of reflective coating 14 has rays 40 through 43 impinging thereon. When viewed in front elevation (FIG. 9) it is seen that portion 45 of bead 11 represents only a very small sector of the bead visible to the audience. Hence, the small sector represented by 45 is the only portion of each bead affected by such extraneous light. In view of this phenomena, which is believed to occur, relatively strong directed light at an angle outside approximately 35° to 45° depending on the specific construction of the screen and the depth to which the beads are embedded in backing member 12 has little if any effect on the brilliance or resolution of the image projected on face 6 of the screen.

Considering now the embodiment of FIG. 6 it is believed that a similar phenomena accounts for the improved resolution and brilliance of an image projected on face 6' under both high outside conditions of illumination as well as when directed light strikes the screen at an angle of 35° to 45° relative to the axis of the beads. It is to be noted that coating 14' which only covers a part of the embedded portion of each bead provides a brilliance of image and degree of resolution similar to the coating 14 which covers all of the embedded portion of the bead of FIG. 4. This phenomena seems to be readily explainable by considering that the area of coating 14' is a relative high percentage of the area of a bead as projected on a plane perpendicular to the Z axis even though the area of coating 14' with respect to the total embedded area of the surface of a bead is substantially smaller. As shown in FIG. 10 when thus projected, there remains only a very small annulus of uncoated area visible to a member of the audience.

It is believed that the ability of the screen of the FIG. 6 embodiment to dispel the effects of extraneous directed light is superior to that of the embodiment of FIG. 4 in view of the following explanation. First consider directed ray 33' impinging on bead 11' FIG. 6, in a direction parallel with the Z axis of the bead. This ray is refracted as it passes through surface 31' of the bead and is reflected by surface 14' to produce return ray 34' which is again refracted at surface 31' of the bead. Hence, the action of a directed ray parallel to the Z axis of a bead 11 is the same as for bead 11 in the embodiment of FIG. 4.

Directed ray 37' at an angle of 45° to the Z axis of bead 11' is similarly refracted at surface 31', reflected at coating 14' to produce return ray 38' which is refracted at surface 31' to return in a direction parallel with directed ray 37'. This action is also the same as for the FIG. 4 embodiment.

Now consider a directed ray 39' at an angle of 50° to the Z axis of a bead. Ray 39' is refracted at surface 31' and impinges on surface 21' of the backing member, located at zone 21 of bead 11'. Since surface 21' is matte black ray 39' is absorbed, and is not reflected back toward its source.

As shown in FIG. 10 directed rays 50–52 impinge on surface 31' of bead 11' at an angle of 40° to the Z axis. Each of these rays is refracted and then reflected to provide a corresponding return ray (not shown) directed towards its source. Ray 53, however, has no corresponding return ray because ray 53 impinges on matte black surface 21' and hence, is not reflected. Therefor, the rays 50–52 impinge on only a small portion 45' of each bead 11'. As shown in FIG. 11, the curved side of portion 45' is spaced from the side edge of bead 11' when viewed in front elevation. Both FIGS. 9 and 10 show that, as the angle of a directed ray increases relative to the Z axis of a bead the portions 45 and 45' onto which these rays impinge becomes smaller. Hence, the greater the angle of a directed ray the less probable is interference with the desired image projected from a location normal to the face of the screen.

Referring now to FIG. 12 there is shown an arrangement for simultaneously projecting two different images on a single screen 1 for view by two different audiences in different locations relative to the screen. As shown, projector 60 is disposed to project on the screen along a line 61 at an angle of between 30° and 50° to a horizontal plane 62 defined by the X and Z axes of a bead. Projector 63 is likewise disposed to project on the screen along a line 64 at an angle of 30° to 50° with plane 60 but on the other side of the plane. Audience 65 views the image projected by projector 60 and audience 66 view the image projected by projector 63.

FIG. 13 shows what is believed to occur when the screen of the FIG. 4 embodiment is used for dual image projection, and the angle of the lines of projection 61 and 64 is 40°. Also shown is a line of vision 67 of audience 65, and a line of vision 68 of audience 66. Directed rays 70 and 71 from projector 60 impinge on bead 11 and are refracted and reflected to provide return rays (not shown) which are viewed by audience 65, located in the region adjacent rays 70 and 71. It is to be noted that rays 70 and 71 are reflected from only a portion 72 of reflective surface 14 on the far side of the plane defined by the X and Z axes of each bead. As shown, the line of vision 68 of audience 66 intersects reflective surface 14 at a point outside portion 72. Hence, directed rays from projector 60 are not viewed by audience 66. Directed rays 73 and 74 from projector 63 impinge on only a portion 75 of the bead, portion 75 being on the opposite side of a bead from the portion 72. Line of vision 67 of audience 65 is such that portion 75 is hidden from the view of audience 65 by the portion of backing member 12 adjacent the exposed surface of a bead. Hence, only audience 66 views the reflection of rays such as 73 and 74 from projector 63.

FIG. 14 shows that the screen of the embodiment of FIG. 6 can also be used for dual image viewing. As shown, rays 70' and 71' parallel with line of projection 61 of projector 60 are refracted to impinge on portion 72' of coating 14'. Line of vision 68 of audience 66 is beyond portion 72' and hence rays such as 70' and 71' are not visible to this audience. However, audience 65 located adjacent line of projection 61 can see the reflected image on portion 72'. However, since portion 72' is substantially smaller than portion 72 the clarity and brilliance of the image in the FIG. 14 embodiment is not as good as in the FIG. 13 embodiment. Directed rays 73' and 74' (FIG. 14) similarly impinge on portion 75' for view only by audience 66, since line of vision 67 is beyond portion 75' of coating 14'.

It has been found that double image viewing is not effective under subdued light conditions rather than total darkness. Hence, it is desirable to have either subdued ambient light conditions or to project a subdued light onto the screen of FIG. 12 from some point along plane 62. Lamps at region 76 adjacent the front of the screen will provide subdued ambient light, whereas a still projector 77 along plane 62 can provide subdued directed light, the intensity of light from projector 77 being much less than that of either projector 60 or projector 63. Since each audience only sees that portion of the projected image which is reflected back toward it there is no interference between the two images and each image can be seen relatively clearly by the audience by which it was intended. Of course, those portions of the directed image that impinge on exposed surface 15 or 15' between beads are merely absorbed and not perceived by either audience. It is believed that such a selective viewing of an image projected on the screen is in part attributable to the magnifying effect of the curved surface of a bead together with the contracted image displayed on the reflective coating at the rear of the bead. Although the screen of the embodiment of FIG. 4 is most effective and desirable for such dual viewing by two audiences the screen of the embodiment of FIG. 6 can also be used even though the degree of resolution and brilliance is not quite as good.

FIGS. 15 and 16 show a third embodiment of the screen of this invention. As shown, beads 11 are embedded in backing member 12 attached to a supporting structure 4. Each bead is provided with a reflective surface in the form of a coating 14 of reflective material. Backing member 12 has portions that surround and project adjacent beads to provide a hood-like shield 80. Each shield 80 is in the form of a generally hemispherical recess having an inner surface 81 that is spaced from and extends arcuately beside the exposed transparent portion of each bead. Surface 81 terminates at exposed face 82 of the backing member. It is to be noted that face 82 is coplanar with the extreme end of the exposed transparent portion of each bead. Both surface 81 and face 82 are matte black to absorb light impinging on these surfaces.

The ability of the screen of the embodiment of FIGS. 15 and 16 to do away with the effects of extraneous directed light is believed superior to that of the embodiments of FIGS. 4 and 6 in view of the following. Consider a light ray 83 directed toward the screen of FIG. 16 at an angle outside the normal angle of view of the audience. This ray 83 strikes face 82 of the backing member and is absorbed by the matte black surface. A ray 84 parallel with ray 83 is seen to impinge on the surface of a bead 11, is refracted as it passes through the surface, is reflected at coating 14 and is again refracted at the surface of the bead. Since shield 80 prevents extraneous light rays such as rays 83, 85, and 86 from impinging on the bead, it is apparent that a much smaller sector than sector 45 (FIG. 9) will receive extraneous light, and hence, there will be less interference with the desired projected image. Rays such as ray 87 striking surface 81 of a shield are absorbed by the matte black material of the surface. Although the embodiment of FIGS. 15 and 16 shows each bead with a coating 14 that covers the entire embedded surface of each bead it is to be understood that a coating such as 14' (FIG. 6) which only partially covers the embedded surface of a bead can be used with equal advantage. It is also to be understood that an arrangement of beads such as shown in FIG. 7 is with the scope of the invention of the embodiment of FIGS. 15 and 16.

Reflective coating 14 and 14' can be any highly reflective material with a photometric brightness greater than 1.8. A preferred composition for the reflective coating is:

Initial pigment dispersion: Lbs./100 gallons
- Water _____ 180.0
- Potassium tripolyphosphate _____ 1.5
- Titanium dioxide, rutile _____ 350.0
- Calcium sulphate _____ 150.0
- Ultramarine blue _____ 0.3

Let down:
- Methocel (methyl cellulose) high viscosity grade _____ 75.0
- Latex, styrene-butadiene (48%) _____ 285.0
- 20% solution phenyl mercury acetate _____ 35.0
- Water _____ 90.0
- Antifoamer _____ (1)
- Additional thickener _____ (2)
- $NH_4OH$ _____ (3)

[1,2,3] As required.

The pigment dispersion is mixed with the let down until the desired consistency is obtained.

A preferred composition for backing member 12 and 12' is as follows:

- Polyester resin, gal. _____ 1
- Cobalt napthenate (accelerator), gal. _____ .02
- Lamp black, lb. _____ .5
- Diatomaceous silica, lb. _____ 2.0
- Methyl ethyl ketone peroxide (catalyst), as required.

This mixture is molded to form the backing member.

Although the preferred embodiments disclosed have been described primarily in the environment of a movie theater it is to be understood that the screen has numerous other uses with corresponding advantages over prior similar structures. It is to be understood that numerous changes may be made without departing from the scope of the invention as defined in the following claims.

What is claimed is:

1. A projector screen for brilliantly displaying the image of pictures projected thereon comprising:
   a generally flat backing member
   a plurality of transparent spheres secured to said banking member, each of said spheres having:
      a reflective surface at a first zone,
      an exposed transparent surface at a second zone, and
      a matte black surface at a third zone
   each of said zones being defined by spaced planes normal to a diameter of a sphere taken in a direction perpendicular to the backing member;
   said third zone of each sphere being between said first and second zone;
   whereby, light directed toward said screen at less than a certain angle to said diameters is brilliantly reflected by said reflective surface for view by an audience, and
   light directed toward said screen at greater than said certain angle is both reflected and absorbed by said reflective and matte black surfaces.

2. A screen in accordance with claim 1 in which: said spheres are disposed in spaced apart relation one to the other in a regular array, with the spaces between spheres exposed and presenting a mattle black surface.

3. A screen in accordance with claim 1 in which said spheres are transparent and have an index of refraction of approximately 1.7.

4. A screen in accordance with claim 1 in which:
   said spheres are transparent; and
   each sphere is of approximately the same diameter in the range of .01 inch to .10 inch.

5. A screen in accordance with claim 1 in which:
   each of said spheres has at least 40% of its surface exposed relative to said backing member,
   said backing member is of matte black material;
   said spheres are partially embedded in said backing member; and
   said matte black surface at said third zone is provided by the matte black material of said backing member.

6. A screen for brilliantly displaying images projected thereon at high levels of outside light comprising:
   a backing member;
   a plurality of transparent beads embedded in said backing to provide an exposed surface and an embedded surface for each bead;
   said embedded surface having a reflective coating thereon;
   each of said beads being spaced one from the other in regular array, with portions of said backing member exposed between adjacent beads over the entire face of said screen, said exposed portions being matte black;
   said exposed portions of said backing member projecting therefrom between adjacent beads and beside the exposed surfaces of such beads to provide a shield for each of said beads;
   said shield being effective to prevent undesired light rays directed toward said screen at an angle greater than a predetermined acute angle to a normal to said screen from impinging upon said reflective coating;
   whereby the effects of such undesired light rays are eliminated.

7. A screen in accordance with claim 6 in which:
   a shield is provided for each bead; and
   each shield is generally circular to extend around the exposed surface of a bead.

8. A screen for brilliantly displaying images projected thereon, comprising in combination:
   a backing member
   a plurality of transparent spheres of a diameter not greater than about .1 inch, each of said spheres including:
      a first portion secured to said backing member, and
      a second portion exposed relative to said backing member;
   a surface of said first portion of each bead being reflective,
   said beads being disposed in non-engaging spaced apart relation a regular array of rectangular coordinates, with exposed areas therebetween, said exposed areas being of matte black material;
   said beads and said exposed matte black areas forming a face onto which an image is to be projected;
   whereby only image characteristic light projected onto said screen from a first region relative to said face is brilliantly displayed for view by an audience in a predetermined region relative to said face, and
   unwanted light emanating from a source outside said first region does not affect the brilliance of the image on said screen.

9. A screen in accordance with claim 8 in which
   said spheres are each of approximately the same diameter and are spaced from each other by distance at least equal to one-fourth the diameter of a sphere.

10. A screen in accordance with claim 8 in which
   said backing member is of matte black material; and
   said exposed matte black areas are exposed areas of said backing member.

References Cited by the Examiner

UNITED STATES PATENTS

| 1,706,218 | 3/1929 | Chretien. | |
| 2,075,853 | 4/1937 | Kanolt | 88—28.9 X |
| 3,034,406 | 5/1962 | McKenzie et al. | 88—28.9 X |

JULIA E. COINER, *Primary Examiner.*